US009266501B2

(12) United States Patent
Swindell et al.

(10) Patent No.: US 9,266,501 B2
(45) Date of Patent: Feb. 23, 2016

(54) SEAT LOCK DEVICE AND METHODS

(71) Applicant: Bean Brothers, LLC, Carrollton, TX (US)

(72) Inventors: Hunter James Swindell, Little Elm, TX (US); Jesse Kennedy Swindell, Edmond, OK (US); Brian Patrick Verhalen, Little Elm, TX (US); Matthew Gerard Verhalen, Frisco, TX (US)

(73) Assignee: Bean Brothers LLC, Carrollton, TX (US)

( * ) Notice: Subject to any disclaimer, the term of this patent is extended or adjusted under 35 U.S.C. 154(b) by 0 days.

(21) Appl. No.: 13/962,838

(22) Filed: Aug. 8, 2013

(65) Prior Publication Data
US 2014/0049092 A1 Feb. 20, 2014

Related U.S. Application Data

(60) Provisional application No. 61/683,785, filed on Aug. 16, 2012.

(51) Int. Cl.
*A47C 31/00* (2006.01)
*E05B 65/44* (2006.01)
*B60R 25/01* (2013.01)
*B60N 2/015* (2006.01)
*B60N 2/36* (2006.01)

(52) U.S. Cl.
CPC ............... *B60R 25/01* (2013.01); *B60N 2/015* (2013.01); *B60N 2/36* (2013.01); *B60N 2/366* (2013.01); *Y10T 70/5996* (2015.04)

(58) Field of Classification Search
CPC .......... B60R 25/01; B60N 2/015; B60N 2/36; B60N 2/366; B60N 2/01516; B60N 2/0155; B60N 2/01583; Y10T 70/5996
USPC ............. 70/258, 261, 237, 52, 53, 32–34, 14, 70/20, 31, 38 R, 39, 38 B, 38 C, 51, 54–56, 70/417; 248/503.1; 296/65.03; 297/336
See application file for complete search history.

(56) References Cited

U.S. PATENT DOCUMENTS

| 762,582 | A | * | 6/1904 | Gregory ............................ 70/39 |
| 906,294 | A | * | 12/1908 | Roschyk ........................... 70/39 |
| D174,171 | S | | 3/1955 | Foreman et al. |
| D221,417 | S | | 8/1971 | Prichard |
| 3,797,284 | A | | 3/1974 | Grossman |
| D231,688 | S | | 5/1974 | Gerlach |
| 3,884,055 | A | | 5/1975 | Vuillemot et al. |

(Continued)

FOREIGN PATENT DOCUMENTS

GB 2114205 A 8/1983

*Primary Examiner* — Lloyd Gall
(74) *Attorney, Agent, or Firm* — PK Patent Law

(57) ABSTRACT

A seat lock device and method for preventing the unauthorized removal and theft of seats are provided. The seat lock device can include a lock body configured to straddle a seat bracket of at least one of a left-hand third row seat and a right-hand third row seat which can be clamped to a floorboard of a vehicle. The lock body can include a series of coaxial bores. A pin assembly can include a pin configured to be inserted through the series of coaxial bores of the lock body. The pin can also be extendable through a pre-existing hole formed in the at least one seat bracket thereby preventing the at least one seat bracket from releasing from the floorboard of the vehicle.

20 Claims, 8 Drawing Sheets

(56) References Cited

U.S. PATENT DOCUMENTS

| | | | |
|---|---|---|---|
| 3,924,426 A * | 12/1975 | Zane et al. ......................... 70/18 |
| 4,047,686 A | 9/1977 | Porter |
| 4,074,550 A | 2/1978 | Rowlings et al. |
| D315,090 S | 3/1991 | Pedersen |
| 5,213,388 A * | 5/1993 | Baker ..................... 296/65.13 |
| 5,255,542 A * | 10/1993 | Fortin ............................. 70/34 |
| 5,375,442 A | 12/1994 | Hammer et al. |
| D359,466 S | 6/1995 | Eggers et al. |
| 5,442,941 A * | 8/1995 | Kahonen et al. .................. 70/34 |
| 5,778,706 A | 7/1998 | Testa et al. |
| 5,987,939 A | 11/1999 | Pitisettakarn |
| D424,407 S | 5/2000 | Wallace |
| D439,133 S | 3/2001 | Hoyland |
| 6,588,239 B1 | 7/2003 | Johansson |
| 6,651,469 B2 * | 11/2003 | Arias ............................. 70/261 |
| 6,769,738 B1 * | 8/2004 | Rivera et al. .................. 297/232 |
| D511,673 S | 11/2005 | Lai |
| 7,051,558 B2 | 5/2006 | Mathers |
| 8,047,029 B1 | 11/2011 | Henry |
| 8,186,186 B1 | 5/2012 | Mahaney et al. |
| 2004/0221626 A1 * | 11/2004 | Palzkill et al. .................... 70/34 |
| 2007/0132265 A1 * | 6/2007 | Tsukamoto ................ 296/65.03 |
| 2008/0067829 A1 * | 3/2008 | Arias ........................ 296/65.03 |
| 2009/0108615 A1 * | 4/2009 | Akiya et al. ............... 296/65.03 |

* cited by examiner

SEAT LOCK DEVICE AND METHODS

CROSS REFERENCE TO RELATED APPLICATION

The present application claims the benefit from earlier filed U.S. Provisional Patent Application No. 61/683,785 filed Aug. 16, 2012, which is incorporated herein in its entirety by reference.

FIELD OF THE INVENTION

The present teachings relate to a locking device, and in particular, to a seat locking device for use in a motor vehicle. More specifically, the present teachings relate to a seat locking device and methods of locking a seat that prevent or deter the theft of third row seats from a sport utility vehicle.

BACKGROUND OF THE INVENTION

The unauthorized removal and theft of third row seats on certain sport utility vehicles is a pervasive and expensive problem. High-rates of stolen third row seats are known to occur on full-sized SUVs built by GENERAL MOTORS including the following models: CHEVROLET TAHOE, CHEVROLET SUBURBAN, CADILLAC ESCALADE, CADILLAC ESCALADE ESV, GMC YUKON, GMC YUKON XL, GMC YUKON DENALI, and GMC YUKON DENALI XL. Each of these vehicles incorporates the use of the GMT900 Model third row seats.

The replacement cost of third row seats is extremely high which has resulted in a large market for stolen third row seats. Once a thief is inside one of these aforementioned sport utility vehicles, all that is needed to remove the third row seat is to release the clamps that secure the third row seat to the floorboard. Easy removal of third row seats occurs because the manufacturer does not provide a locking mechanism that allows owners to prevent the unauthorized removal of third row seats. As a result, a thief just needs to gain entry into the vehicle and they can then readily release and remove the third row seat.

Accordingly, there exists a need for devices and methods that can prevent the unauthorized release and theft of third row seats from sport utility vehicles.

SUMMARY OF THE INVENTION

The present teachings provide a seat lock device including a lock body configured to straddle a seat bracket of at least one of a left-hand third row seat and a right-hand third row seat clamped to a floorboard. The lock body can include a series of coaxial bores. A pin assembly can include a pin configured to be inserted through the series of coaxial bores of the lock body such that the pin is also extendable through a pre-existing hole formed in the at least one seat bracket thereby preventing the at least one seat bracket from releasing from the floorboard.

The present teachings also provide a seat lock device including a lock body defining at least one of a left channel and a right channel. Each of the left channel and the right channel can be shaped to fit about the bracket mechanism of a left-hand seat and a right-hand seat holding the seat to a floorboard. The lock body can include a series of coaxial bores. The seat lock device can further include a pin assembly including a pin arm and a pin. The pin can be configured to extend through at least one pre-existing hole formed in the bracket mechanism of the left-hand seat and the right-hand seat to prevent the bracket mechanism from releasing from the floorboard when the pin is inserted through the series of coaxial bores formed in the lock body.

The present teachings still further provide a method of locking a seat to a floorboard of a vehicle. The method includes providing a lock body configured to straddle a seat bracket of at least one left-hand seat and right-hand seat, the seat lock body including a series of coaxial bores. The method further includes inserting a pin through the series of coaxial holes formed in the lock body and through a pre-existing hole formed in the seat bracket of the at least one left-hand seat and right-hand seat thereby preventing the release of the seat bracket that secures the least one left-hand seat and right-hand seat to a floorboard.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings relate to a seat lock device that can prevent the unauthorized removal and theft of third row seats.

In particular, the seat lock device of the present teachings can be used to prevent the unauthorized theft of third row seats from full-sized GENERAL MOTORS sport utility vehicles (SUV) manufactured from 2007 through 2013. In use, the seat lock device of the present teachings can operate to prevent the operative movement and release of the brackets or clamps that secure the third row seats to the floorboard of the SUV, hence rendering the seat assembly unremovable from the vehicle. While the seat lock device of the present teachings is disclosed for locking a seat to and within a motor vehicle, it could be used in various other environments where unauthorized tampering and removal of any object is desired.

Figure 1A:
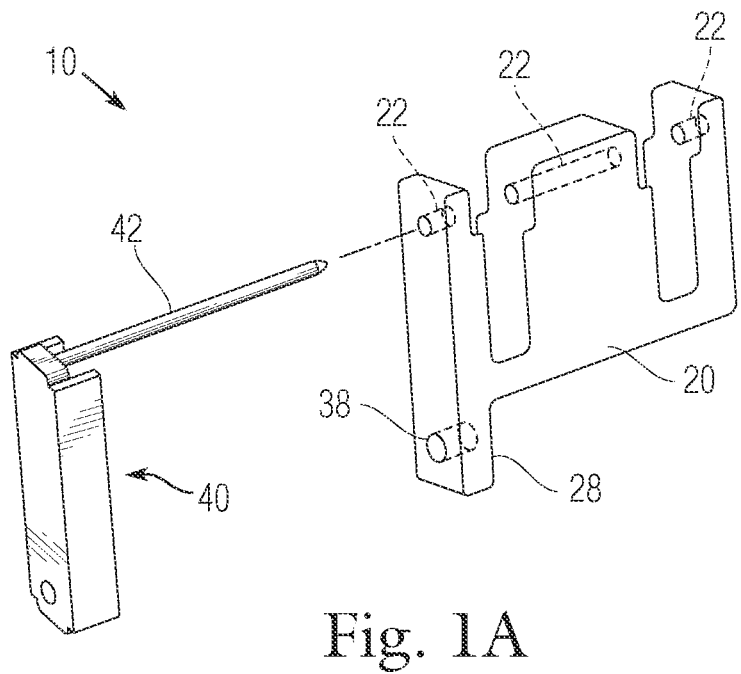
FIG. 1A shows a perspective view of a pin assembly being inserted into the lock body of the seat lock device of the present teachings.
Figure 1B:
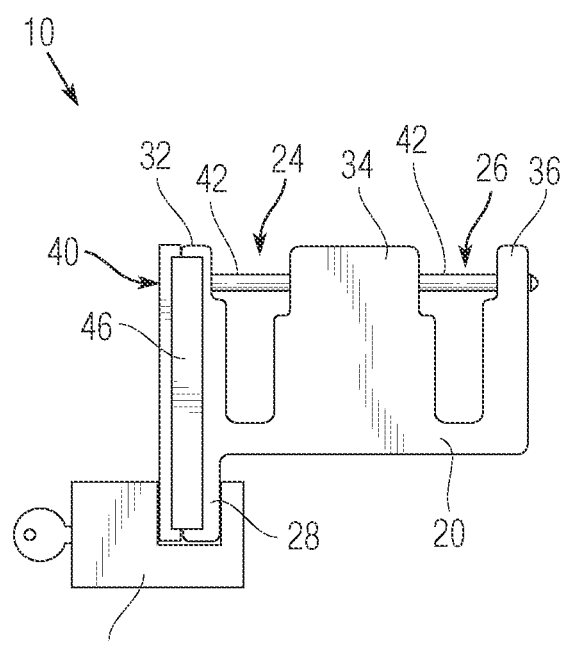
FIG. 1B shows a side view of the seat lock device of the present teachings.
Figure 1C:
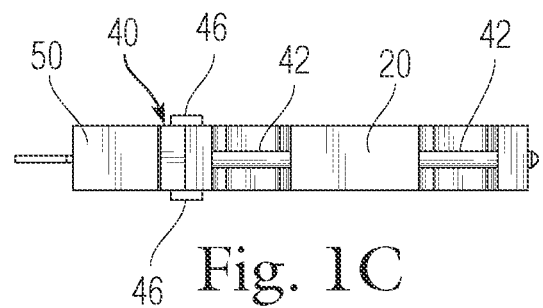
FIG. 1C shows a top view of the seat lock device of the present teachings.
Figure 1D:
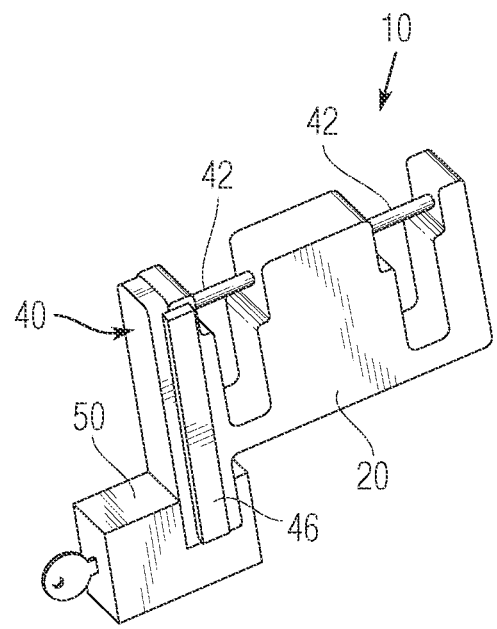
FIG. 1D shows a perspective view of the seat lock device of the present teachings.

FIGS. 1A-1D show a preferred embodiment of the seat lock device 10 of the present teachings. The seat lock device 10 can include several components, that when used in conjunction with one another, prevent the unauthorized removal of third row seats from a vehicle, such as an SUV. The seat lock device 10 of the present teachings can include a lock body 20 and a pin assembly 40. The pin assembly 40 can include a pin 42 that can be inserted through a series of coaxial bores 22 formed in the lock body 20. As shown in FIGS. 1B-1D, after the pin 42 is inserted into the lock body 20, a lock 50 can then be used to securely lock the pin assembly 40 to the lock body 20 to prevent unauthorized tampering with the seat lock device 10.

As will be described in more detail below, when the lock body 20 is arranged about the brackets of the left-hand and right-hand third row seats and the pin 42 is inserted through the series of coaxial bores 22, the pin 42 also extends through pre-existing openings formed in the seat brackets. In this installed position of the seat lock device 10, the pin 42 of the pin assembly 40 acts as a block to stop the clasps of the brackets from opening thereby preventing the third row seats from being released from the floorboard of the vehicle. The lock 50, in combination with the structure and shape of the lock body 20 and pin assembly 40, prevent unauthorized tampering with the bracket mechanisms securing the third row seats to the vehicle.

Referring to FIGS. 1B and 1C, the lock body 20 can include a relatively thick plate and can include one or more channels or spaces formed in the plate. For example, a forward portion of the lock body 20 can include a left channel 24 and a right channel 26. The channels 24, 26 can be shaped to allow the lock body 20 to fit closely about the innermost bracket mechanisms of a left-hand and a right-hand third row seat. For example, the channels 24, 26 can include a varying width consistent with the varying widths of the bracket mechanisms as well as a length consistent with the length of the bracket mechanisms. The shape of the channels 24, 26 can correspond to the design and shape of each seat's bracket mechanism to allow the lock body 20 to achieve a close fit about the seat brackets and provide maximum security and protection for the pin 42 when it is inserted into the lock body 20. The channels 24, 26 in the lock body 20 can define a left arm 32, a center body section 34, and a right arm 36 of the lock body 20. As best shown in FIGS. 1A and 1C, the series of coaxial bores 22 can be arranged to extend through each of the left arm 32, the center body section 34, and the right arm 36 of the lock body 20.

Furthermore, the lock body 20 can include a lock arm 28 that can extend from the lock body 20. The lock arm 28 can include any type of flange or extension onto which the lock 50 can be secured to or rest against to prevent removal of the pin assembly 40. For example, a lock arm 28 can be arranged to extend outwardly from a rearward portion of the lock body 20 and can include a bore 38 through which the shackle of the lock 50 can be inserted.

Figure 2A:
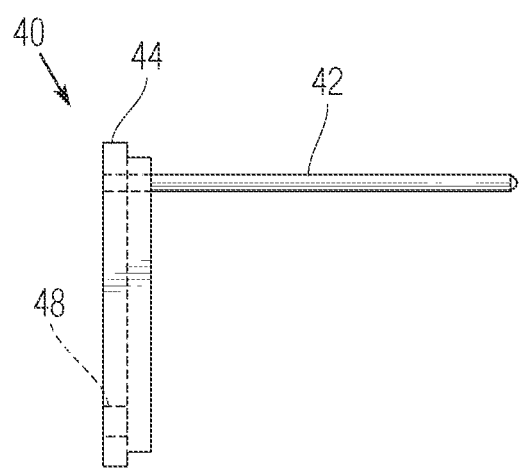
FIG. 2A shows a side view of the pin assembly of the seat lock device of the present teachings.
Figure 2B:
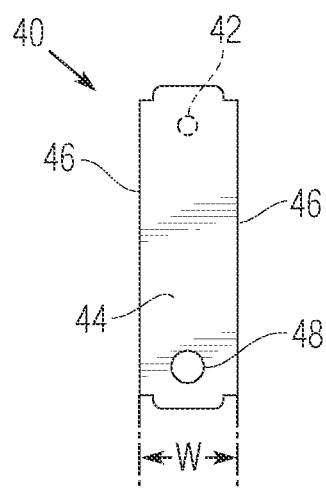
FIG. 2B shows an end of the pin assembly shown in FIG. 2A.

Referring to FIGS. 2A and 2B, the pin assembly 40 of the seat lock device 10 of the present teachings can include a pin arm 44 and the pin 42 which can be arranged to extend from the pin arm 44. The pin 42 can be arranged to extend substantially perpendicular with respect to at least a portion of the pin arm 44. The pin arm 44 can be in the shape of a plate having a width, W. The pin arm width, W, can be at least substantially equal to the thickness of the lock body 20. However, the pin arm 44 can have any width as would be appreciated by one of ordinary skill in the art.

As best shown in FIG. 2B, the pin arm 44 can be in the shape of an oblong rectangular plate having a first end and a second end. The pin 42 can be arranged to extend from the first end of the pin arm 44. A bore 48 can be arranged in the second end of the pin arm 44. The bore 48 of the pin arm 44 can be arranged to align with the bore 38 formed on the lock arm 28 of the lock body 20 when the pin assembly 40 is in an operative position with the lock body 20. The shackle of the lock 50 can be thread through the bores 38, 48 and used to secure the pin assembly 40 to the lock body 20.

The pin 42 can have a length that allows it to extend through the coaxial bores 22 in each of the left arm 32, the center body section 34, and the right arm 36 of the lock body 20. In other words, the pin 42 can have a length substantially equal to the width of the lock body 20. The pin 42 can include a round cross-section but could include any cross-sectional shape. The distal end of the pin 42 can end in a point.

In a typical full-sized SUV, each of the respective bracket mechanisms for the left-hand and right-hand third row seats can be arranged to clamp to a metal bar fixed to the floorboard so as to secure each third row seat to the vehicle. Each of the bracket mechanisms for the third row seats can include a user-actuable handle which when actuated can release or open the respective seat bracket by way of a linkage and/or cable mechanism. The handle enables the bracket mechanisms of each third row seat to be released from clasping the metal bar of the floorboard thereby allowing the third row seats to be independently detached and removed from the vehicle.

In use of the seat lock device 10 of the present teachings, the lock body 20 can be positioned on the floorboard of the SUV with the front portion thereof facing each of the innermost bracket mechanisms at the front end of the left-hand and right-hand third row seats. The lock body 20 can be moved into a position so as to straddle the two innermost bracket mechanisms of the left-hand and right-hand third row seats. The pin 42 of the pin assembly 40 can then be inserted successively through the series of coaxial bores 22 formed in the lock body 20, that is, through the coaxial bores 22 formed in the left arm 32, the center body section 34, and the right arm 36. As the pin 42 is inserted through the series of coaxial bores 22, the pin 42 simultaneously extends through pre-existing holes formed in the respective bracket mechanisms of the left-hand and right hand third row seats. When the pin 42 is situated within these pre-existing holes, the pin 42 acts to prevent the clasps on the respective seat brackets from opening when the user actuates the handle. Accordingly, with the pin 42 is in place, the release function of each of the left-hand and right-hand third row seats is disabled, thereby preventing the release of the third row seats from the floorboard and their removal from the vehicle.

After the pin 42 has been inserted through the coaxial bores 22 formed in the lock body 20 and in the seat brackets, the lock body 20 and the pin assembly 40 can be secured together using the lock 50, see FIGS. 1B and 1D. When the pin assembly 40 is locked to the lock body 20, the lock body 20 prevents unauthorized tampering with the pin 42 thereby deterring or preventing the theft of the third row seats. More particularly, the geometry of the lock body 20 allows it to fit closely about the innermost bracket mechanisms of the third row seats. This restricts access to the pin 42 and reduces the possibility of someone successfully prying the pin 42 out from the lock body 20.

Furthermore, to prevent the insertion of an instrument between the pin arm 44 and the lock body 20 and prying the pin 42 away from the lock body 20, a security tab 46 can be arranged on either or both sides of the pin arm 44. The security tabs 46 can be flange-like in shape and can extend outwardly from the lateral ends of the pin arm 44. The security tabs 46 can extend over at least a portion of the junction between the pin arm 44 and the end of the lock body 20 when the pin 42 is fully inserted through the series of coaxial bores 22 of the lock body 20. The security tabs 46 operate to block an instrument from being inserted into the junction and using leverage to attempt to remove the pin 42 from the lock body 20.

The lock body 20 and the pin arm 44 can be cut out of ¾ inch steel. The pin 42 can be made from 3/16 inch round steel bar. The pin 42 can be welded to the pin arm 44 to form the pin assembly 40. Alternatively, the pin arm 44 along with the security tabs 46 can be formed from a single block of steel using a routing process. When the lock body 20 is made from ¾ inch plate steel, the distance between the inner walls of the security tabs 46 can be about ¾ inches to allow the pin arm 44 to hug an end of the lock body 20 in an installed position.

According to various embodiments, the lock body 20 can have a width of about 4 inches and a length of about 2.5 inches. With the use of a lock arm 28, the length of the lock body can be about 3.5 inches along one side thereof. The distance from a middle axis of the left channel 24 to the middle axis of the right channel 26 can be from about 2.375 inches to about 2.75 inches, and preferably about 2.5 inches. As previously discussed above, the shape of the channels 24, 26 can correspond to the design and shape of each seat's bracket mechanism to allow the lock body 20 to achieve a close fit about the seat brackets and provide maximum security and protection for the pin 42 when it is inserted into the lock body 20.

According to various embodiments, the width of the pin arm 44 can be about 1.0625 inches and a length of about 3.5 inches. With a length of about 3.5 inches, the pin arm 44 can extend along the entire side of the lock body 20. The pin 42 can extend out of the pin arm 44 about 4.0625 inches.

Figure 3:
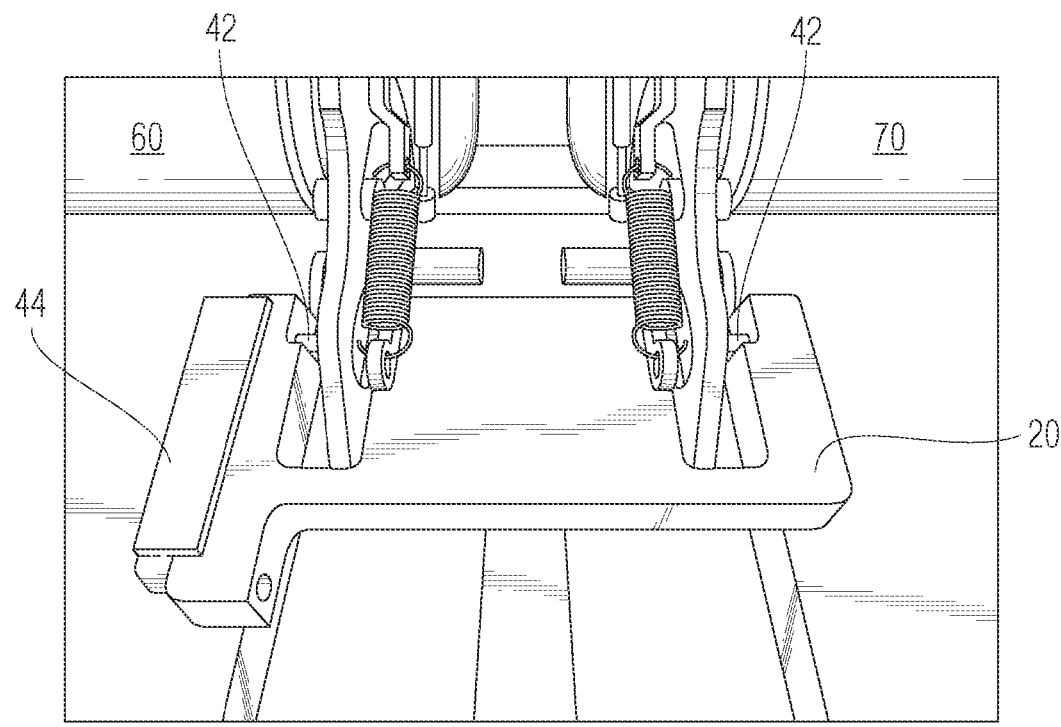
FIG. 3 shows the seat lock device of the present teachings engaged with the third row seat brackets of a sport utility vehicle.

FIG. 3 shows the seat lock device 10 of the present teachings engaged with the innermost seat brackets of a left-hand third row seat 60 and a right-hand third row seat of a GENERAL MOTORS SUV. The pin 42 is shown extending through the openings formed in the brackets of the third row seats, as well as extending through the series of coaxial bores 22 formed in the lock body 20. With the pin 42 in place, the release function of each of the third row seats is disabled, thus preventing the removal of the third row seats from the SUV.

Figure 4:
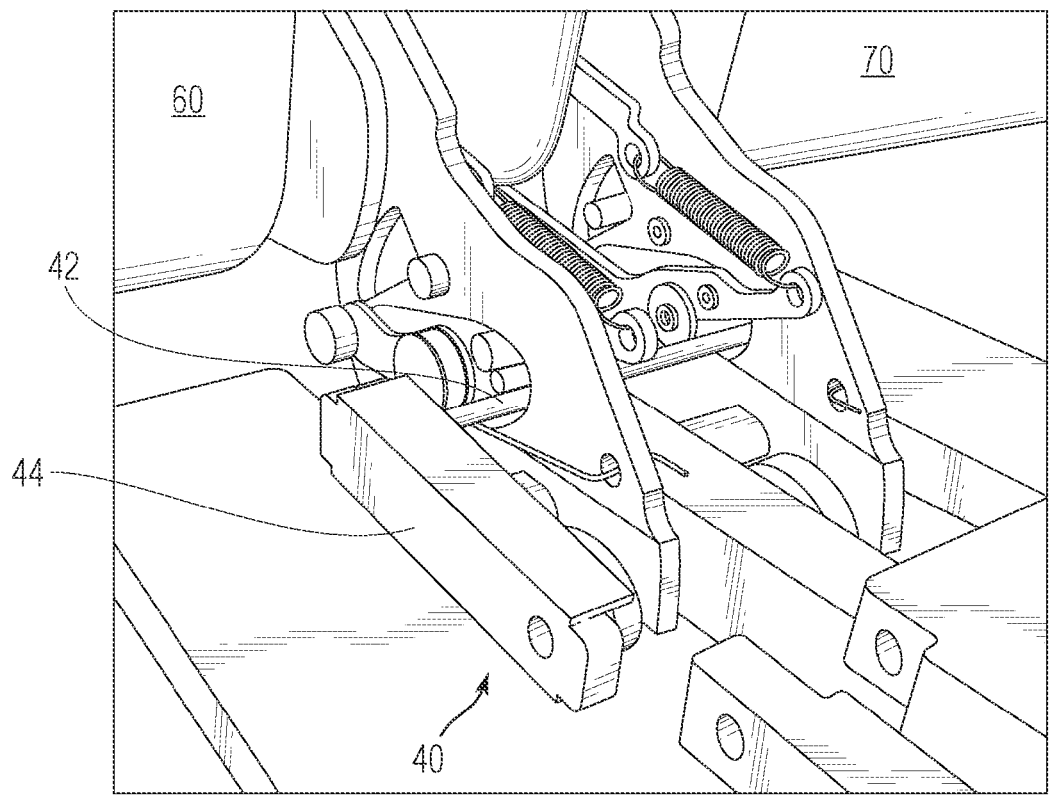
FIG. 4 shows a pin assembly (omitting the lock body) extending through the openings formed in the third row brackets.

FIG. 4 shows the pin assembly 40 with only the pin 42 (i.e. omitting the lock body 20) extending through the openings formed in the seat brackets to better illustrate how and where the pin 42 extends through the seat brackets of the third row seats 60, 70.

Figure 5:
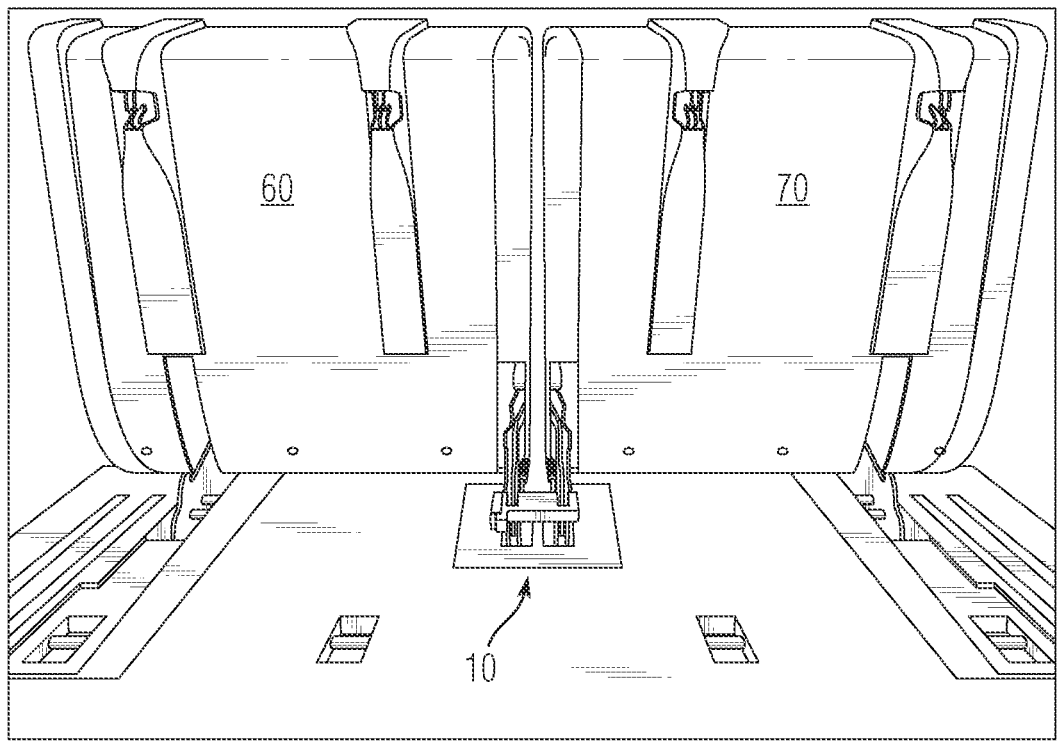
FIG. 5 shows a pair of third row seats in a "storage" position, along with the seat lock device of the present teachings being engaged with the third row seat brackets.

FIG. 5 shows each of the left-hand 60 and right-hand 70 third row seats of a GENERAL MOTORS SUV in a "storage" position, along with the seat lock device 10 of the present teachings being engaged with the innermost seat brackets of each of the third row seats 60, 70. Each of the left-hand 60 and right-hand 70 third row seats are shown after each have been independently "tumbled up" into their respective "storage" positions. The front brackets of the third row seats are shown secured to the floorboard of the SUV and each of the third row seats 60, 70 are locked in an upright position. Either or both of the third row seats 60, 70 can be "tumbled up" into this position when there is a need for more storage in the rear of the SUV. In the "storage" position, the seat lock device 10 of the present teachings can be engaged with the innermost seat brackets of the SUV, as shown.

Moreover, the seat lock device 10 of the present teachings can be used to prevent the unauthorized removal of a single third row seat from the vehicle. With right-hand third row seat 70 removed from the vehicle, the seat lock device 10 of the present teachings can be used in the same manner as discussed above with respect to two third row seats 60, 70 but the pin 42 would be arranged to extend only through the bracket mechanism of the left-hand third row seat 60. Alternatively, with the left-hand third row seat 60 removed from the vehicle, the seat lock device 10 of the present teachings would be flipped over so that the pin arm 44 and the lock arm 28 are oriented on the right side of the device 10, and the pin 42 would then extend only through the bracket mechanism of the right-hand third row seat 70.

Figure 6:
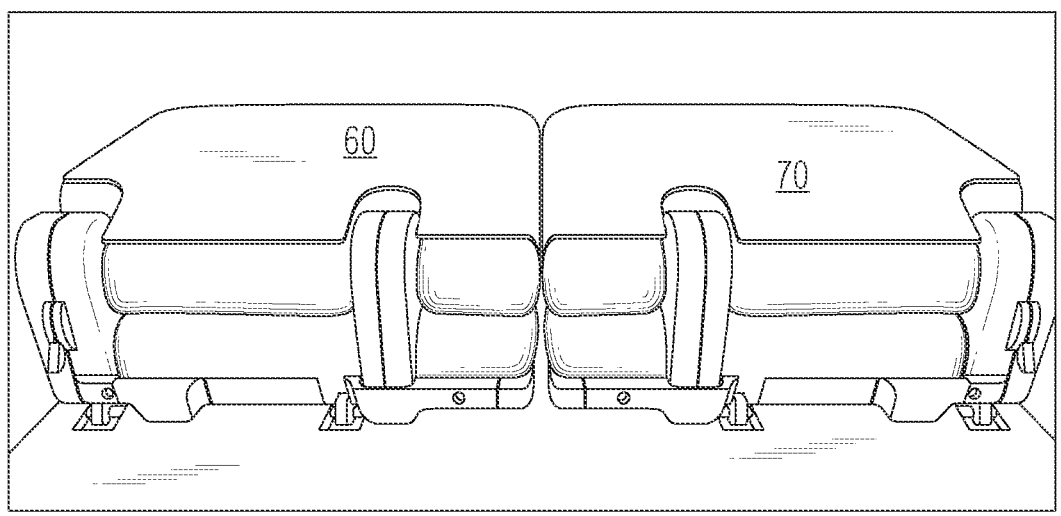
FIG. 6 shows the pair of third row seats of FIG. 5 fully installed into the floorboard of a sport utility vehicle.

FIG. 6 shows the left-hand and right-hand third row seats 60, 70 as fully installed onto the floorboard of the SUV. The seat backs are still shown folded down. While not shown in FIG. 6 as the third row seats 60, 70 are fully installed, the seat lock device 10 of the present teachings continues to be engaged with the seat brackets of the SUV thereby preventing the third row seats 60, 70 from being released and removed from the SUV. Accordingly, the design of the seat lock device 10 of the present teachings allows the third row seats to be fully functional and to be independently movable into their "storage" position when secured in an operative position to the seat brackets.

FIGS. 7-11 show additional embodiments of the seat lock device 10 of the present teachings.

Figure 7:
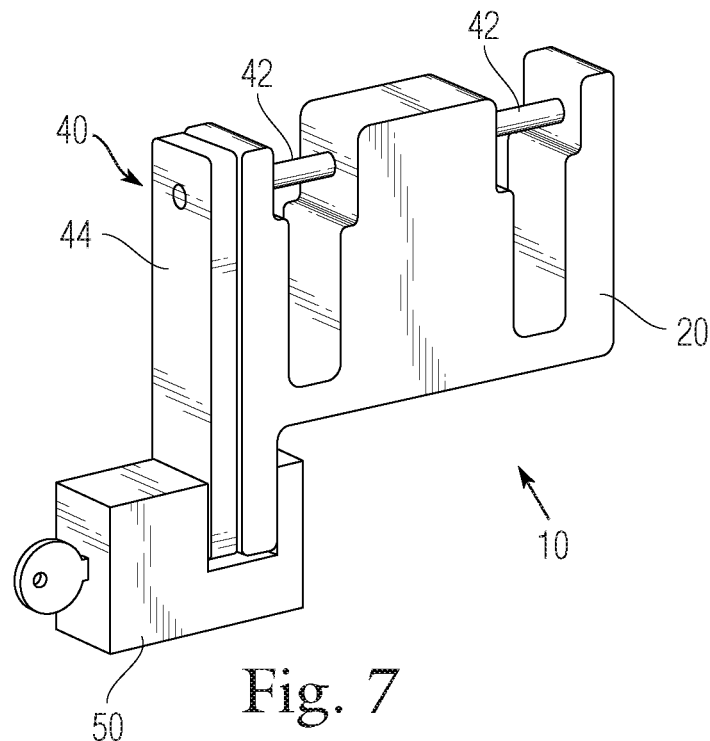
FIG. 7 shows a perspective view of a further embodiment of the seat lock device of the present teachings.

FIG. 7 shows a seat lock device 10 where the pin arm 44 of the pin assembly 40 lacks security tabs 46.

Figure 8:
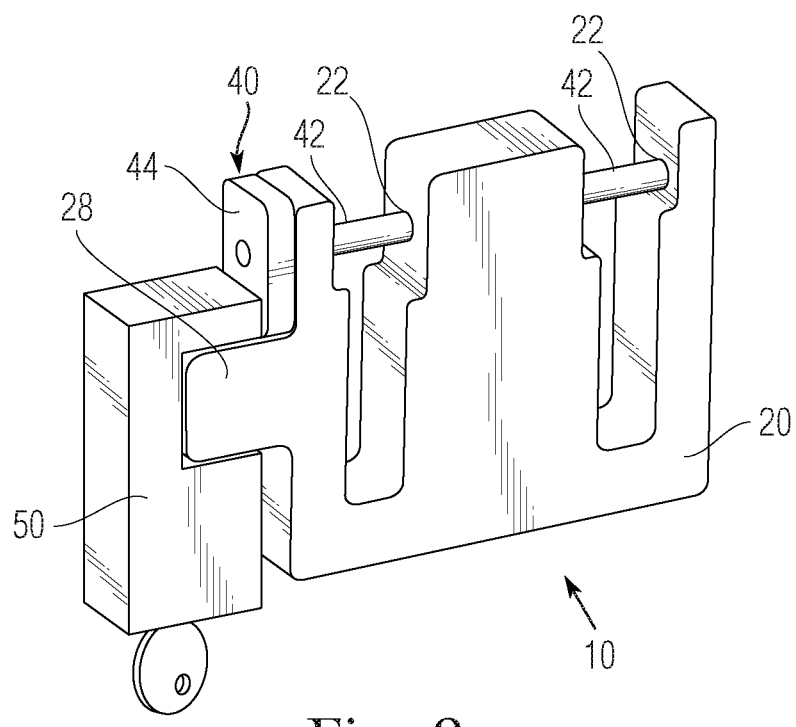
FIG. 8 shows a perspective view of another embodiment of the seat lock device of the present teachings.

FIG. 8 shows a seat lock device 10 where the lock arm 28 of the lock body 20 extends from a side of the lock body 20. Moreover, the length of the pin arm 44 can be shortened such that, for example, the pin arm 44 can be substantially square-shaped. In this embodiment, the shackle of the lock 50 can be arranged to extend through a bore formed in the lock arm 28 while the body of the lock 50 operates to prevent the pin assembly 40 from being removed from the lock body 20.

Figure 9:
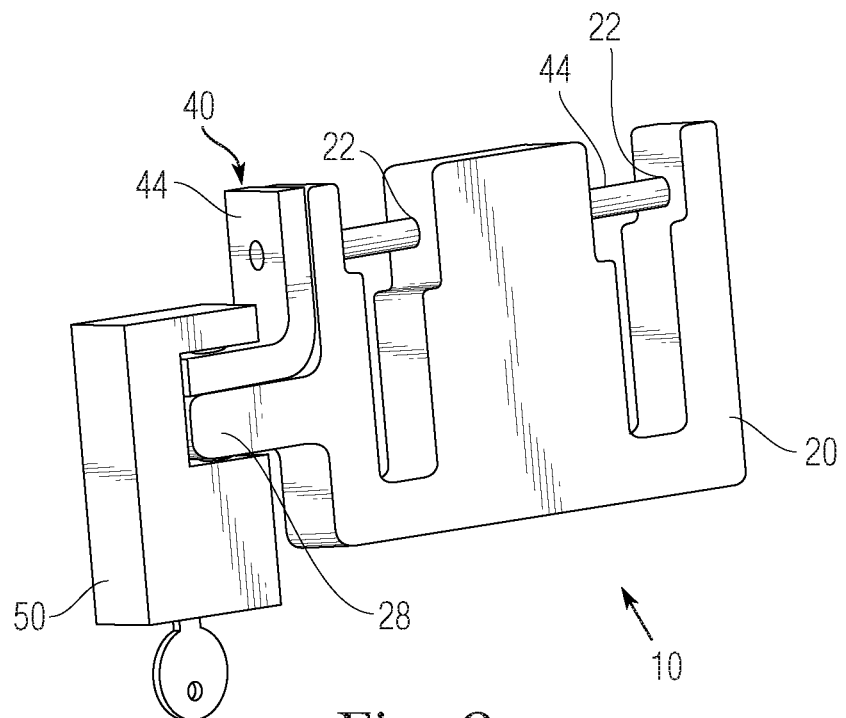
FIG. 9 shows a perspective view of yet another embodiment of the seat lock device of the present teachings.

FIG. 9 also shows a seat lock device 10 where the lock arm 28 of the lock body 20 extends from a side of the lock body 20. However, the pin arm 44 includes an L-shape in which a first portion of the pin arm 44 extends along an end of the lock body 20 and a second portion of the pin arm 44 extends along a side of the lock arm 28. In this embodiment, the shackle of the lock 50 can be arranged to extend through a bore formed in the second portion of the L-shaped pin arm 44, as well as through a bore in the lock arm 28, thereby preventing the pin assembly 40 from being removed from the lock body 20.

Figure 10:
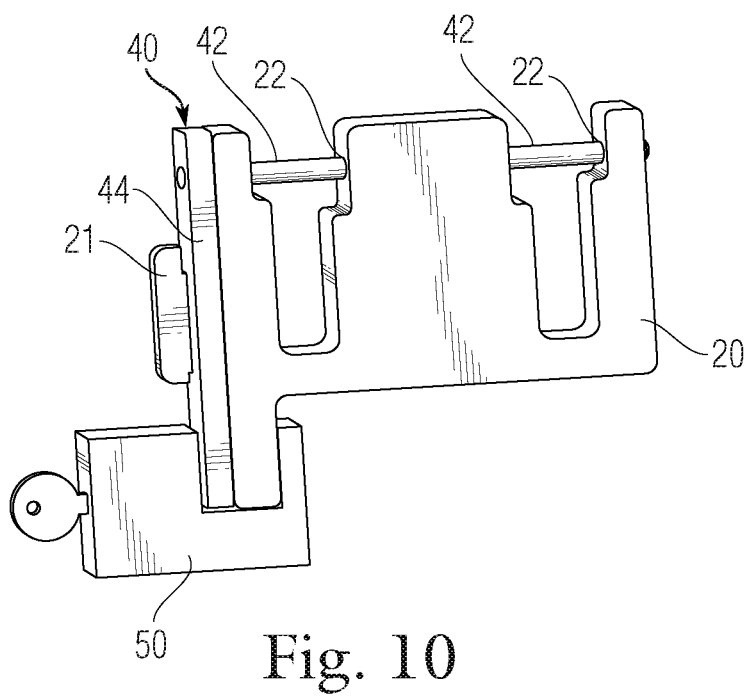
FIG. 10 shows a perspective view of still another embodiment of the seat lock device of the present teachings.
Figure 11:
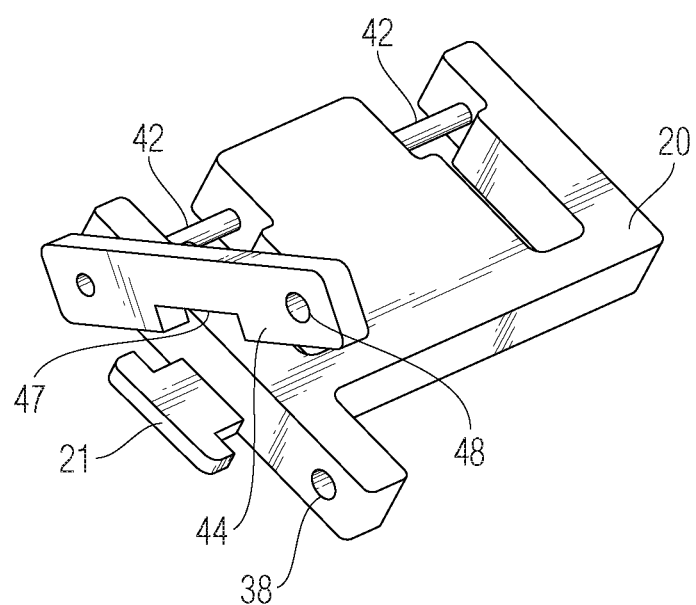
FIG. 11 shows a perspective view of the seat lock device of FIG. 10 with the lock removed and the pin arm pivoted upwardly.

FIGS. 10 and 11 show a seat lock device 10 where the lock body 20 includes a T-shaped projection 21 extending from a side of the lock body 20. As shown in FIG. 11, the pin 42 of the pin assembly 40 can be inserted through the series of coaxial bores 22 when the pin arm 44 is in an upwardly pivoted position. After the pin 42 is fully inserted into the lock body 20, the pin arm 44 can be pivoted downwardly towards the T-shaped projection 21 so that a cutout 47 formed in the pin arm 44 can fit about the base of the T-shaped projection 21. The shackle of the lock 50 can then be threaded through the lined up bores 38, 48 formed in the lock body 20 and pin assembly 40, respectively. If an instrument were to be inserted between the pin arm 44 and the lock body 20, the pin arm 44 would bump up against the T-shaped projection 21 and prevent the pin 42 from being pried out of the lock body 20.

The seat lock device 10 of the present teachings has several functions. A first function is to secure the pin 42 within the seat brackets so that it cannot be removed from the seat brackets or the lock body 20. A second function is to limit access or exposure of the pin 42 so the pin 42 cannot be cut or tampered with. The geometric shape of the lock body 20 of the present teachings limits the exposure of the pin 42 while still maintaining the full functionality of the third row seat.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A seat lock device comprising:
   a lock body including a plate formed with a left channel cutout and a right channel cutout, the left channel cutout and the right channel cutout each having an elongated shape configured to allow the lock body to fit closely about a seat bracket of a left-hand third row seat and a seat bracket of a right-hand third row seat clamped to a floorboard of a sport utility vehicle, the left channel cutout and the right channel cutout formed in the lock body defining a left arm, a center body portion, and a right arm of the lock body, each of the left arm, the center body portion, and the right arm including a series of coaxial bores; and
   a pin assembly including a pin configured to be insertable through the series of coaxial bores of the lock body as well as through a pre-existing opening formed in each of the seat brackets when the lock body is arranged about the seat brackets thereby preventing the seat brackets from releasing from the floorboard of the sport utility vehicle.

2. The seat lock device of claim 1, further comprising a lock configured to secure the pin assembly to the lock body in a manner that the pin cannot be removed from the lock body.

3. The seat lock device of claim 1, wherein the pin assembly further includes a pin arm operatively attached to the pin.

4. The seat lock device of claim 3, wherein the pin arm is capable of being secured to the lock body in a manner that prevents the pin from being removed from the lock body.

5. The seat lock device of claim 4, wherein the pin arm extends along a side end portion of the lock body when the pin arm is secured to the lock body.

6. The seat lock device of claim 4, wherein the pin arm is capable of being secured to the lock body by way of bores formed in each of the pin arm and the lock body.

7. The seat lock device of claim 6, wherein the lock body includes a lock arm and wherein the pin arm is capable of being secured to the lock body by way of a bore formed in the lock arm.

8. The seat lock device of claim 3, wherein the pin arm includes at least one security tab.

9. The seat lock device of claim 1, wherein each of the left channel cutout and the right channel cutout have an elongated, substantially rectangular shape.

10. The seat lock device of claim 1, wherein the plate forming the lock body has a thickness that allows the left-hand third row seat and the right-hand third row seat to be fully functional as seats when the seat lock device is secured to the seat brackets.

11. A seat lock device comprising:
    a lock body including a plate defining at least one cutout having an elongated shape and configured to allow the lock body to closely fit about a bracket mechanism of a third row seat assembly of a sport utility vehicle, the at least one cutout in the lock body defining a first arm and a center body portion, each of the first arm and center body portion including a series of coaxial bores; and
    a pin assembly including a pin arm and a pin;
    wherein the pin is configured to extend through a pre-existing hole formed in the bracket mechanism of the third row seat assembly to prevent the bracket mechanism from releasing from a floorboard of the sport utility vehicle when the pin is inserted through the series of coaxial bores formed in the lock body; and
    wherein the pin arm of the pin assembly extends along a side end portion of the lock body and the pin arm is capable of being secured to the side end portion of the lock body to prevent the pin from being removed from the lock body.

12. The seat lock device of claim 11, wherein the at least one cutout in the plate of the lock body includes an elongated, substantially rectangular shape.

13. The seat lock device of claim 11, further including a lock capable of securing the pin arm to the lock body.

14. The seat lock device of claim 11, wherein the pin arm is capable of being secured to the lock body by way of bores formed in each of the pin arm and the lock body.

15. The seat lock device of claim 11, wherein the lock body includes a lock arm and wherein the pin arm is capable of being secured to the lock body by way of a bore formed in the lock arm.

16. The seat lock device of claim 11, wherein the pin arm includes at least one security tab.

17. The seat lock device of claim 11, wherein the pin extends substantially perpendicular to the pin arm.

18. The seat lock device of claim 11, wherein the plate forming the lock body has a thickness that allows the third row seat assembly to be fully functional as a seat when the seat lock device is secured to the bracket mechanism.

19. A method of locking a third row seat assembly to a floorboard of a sport utility vehicle comprising:
    providing a lock body including a plate formed with a left channel cutout and a right channel cutout, the left channel cutout and the right channel cutout each having an elongated shape and defining a left arm, a center body portion, and a right arm, each of the left arm, the center body portion, and the right arm including a series of coaxial bores;
    positioning the lock body about the seat bracket of a left-hand third row seat and a seat bracket of a right-hand third row seat with each seat bracket being clamped to a floorboard of a sport utility vehicle in a position whereby each of the left channel cutout and the right channel cutout fit closely about a respective seat bracket;
    inserting a pin through the series of coaxial holes formed in the lock body and through a pre-existing hole formed in each of the seat brackets thereby preventing the seat brackets from releasing from the floorboard of the sport utility vehicle.

20. The method of claim 19, further comprising locking the pin to the lock body.

* * * * *